US012210319B2

(12) United States Patent
Biegert et al.

(10) Patent No.: US 12,210,319 B2
(45) Date of Patent: Jan. 28, 2025

(54) MOON PHASE DISPLAY

(71) Applicant: QLOCKTWO License GmbH, Schwäbisch Gmünd (DE)

(72) Inventors: Marco Biegert, Schwäbisch Gmünd (DE); Andreas Funk, Schwäbisch Gmünd (DE)

(73) Assignee: QLOCKTWO LICENSE GMBH, Schwäbisch (DE)

( * ) Notice: Subject to any disclaimer, the term of this patent is extended or adjusted under 35 U.S.C. 154(b) by 338 days.

(21) Appl. No.: 17/801,307

(22) PCT Filed: Dec. 17, 2021

(86) PCT No.: PCT/EP2021/086596

§ 371 (c)(1), (2) Date: Aug. 22, 2022

(87) PCT Pub. No.: WO2022/129573

PCT Pub. Date: Jun. 23, 2022

(65) Prior Publication Data

US 2023/0098642 A1 Mar. 30, 2023

(30) Foreign Application Priority Data

Dec. 18, 2020 (EP) .................................... 20215658

(51) Int. Cl.

*G04B 19/26* (2006.01)
*G04B 19/253* (2006.01)
*G09F 11/02* (2006.01)

(52) U.S. Cl.

CPC ..... *G04B 19/268* (2013.01); *G04B 19/25393* (2013.01); *G09F 11/025* (2013.01)

(58) Field of Classification Search

CPC .................. G04B 19/268; G04B 19/26; G04B 19/25393; G09F 11/025

See application file for complete search history.

(56) References Cited

U.S. PATENT DOCUMENTS 8,250,793 B1 * 8/2012 Halula .................. G09F 11/025 40/208
2006/0169651 A1 8/2006 Lyons et al.

(Continued)

FOREIGN PATENT DOCUMENTS

EP 2 853 957 A1 4/2015
EP 3 098 671 A1 11/2016
GB 2281999 A 3/1995

OTHER PUBLICATIONS

PCT/EP2021/086596; International Search Report/Written Opinion; Mailing Date Mar. 30, 2022 (9 pages).

(Continued)

*Primary Examiner* — Edwin A. Leon
*Assistant Examiner* — Sean R Brannon
(74) *Attorney, Agent, or Firm* — Barclay Damon LLP

(57) ABSTRACT

A moon phase display includes a frame and a plurality of display elements supported by the frame and rotatable relative to the frame. The plurality of display elements further includes a first side face on which an illuminated moon portion is depicted and a second side face. A first rotational position in which the first side face is arranged along a display plane wherein the first side faces together arranged on along the display plane represent a full moon. A second rotational position in which the second side face is arranged along the display plane. A drive rotates each of the plurality of display elements independently. A controller actuates the drive so that each one of the plurality of display elements is rotated into the second rotational position until all of the plurality of display elements are located in the second rotational position.

18 Claims, 4 Drawing Sheets

(56) References Cited

U.S. PATENT DOCUMENTS

| | | | | |
|---|---|---|---|---|
| 2008/0121057 | A1* | 5/2008 | Janson | G09F 11/025<br>74/412 R |
| 2018/0267474 | A1* | 9/2018 | Lagorgette | G04B 19/268 |

OTHER PUBLICATIONS

PCT/EP2021/086596; English Translation of International Search Report; Mailing Date Mar. 30, 2022 (2 pages).

PCT/EP2021/086596; English Translation of International Preliminary Report on Patentability; Date of Issuance Jun. 13, 2023 (4 pages).

* cited by examiner

MOON PHASE DISPLAY

CROSS REFERENCE TO RELATED INVENTION

This application is a national stage application pursuant to 35 U.S.C. § 371 of International Application No. PCT/EP2021/086596, filed on Dec. 17, 2021, which claims priority to, and benefit of, European Patent Application No. 20215658.4, filed Dec. 18, 2020, the entire contents of which are hereby incorporated by reference.

TECHNOLOGICAL FIELD

The following disclosure relates to an inventive moon phase display comprising a movable display element.

BACKGROUND

A frequently encountered design uses a circular disc which rotates once every 59 days. Two circles, which each symbolize the moon, are represented symmetrically to the axis of rotation on the front of the disc. An opening is configured in a dial arranged in front of the disc, through which opening a sector of the disc spanning approximately 180° is visible. This opening has a special form in which approximately circular arc-shaped portions form the opening edges running in the radial direction of the sector. In each case, the rotation of the disk pushes one of the two representations of the moon out from under one of these opening edges, so that a crescent-shaped moon becomes visible, which enlarges to a full circle until it is concealed, in turn, by the other opening edge in a crescent-shaped manner. Shortly thereafter, the second representation of the moon appears under the first opening edge. An example of such a moon phase display is described in the publication EP 3 098 671 A1.

The moon phase can be displayed in a similar way by moving the disc having a special opening in front of a fixed representation of the moon. In order to represent a moon which is smaller in diameter, a circular opening can also be configured in a disk and moved relative to a slightly smaller representation of the moon in terms of the diameter. To this end, more than two representations of the moon can be distributed over the circumference and the rotational speed can be reduced accordingly.

Yet another variant, in which one disk has multiple openings and the moon is represented on a further disk, wherein both disks move at different rotational speeds, has become known from the publication EP 2 853 957 B1.

The common feature of all the moon phase displays explained above is that the movable display element or respectively the movable display elements have large dimensions compared to the display of the moon phase attained. As a general rule, the known moon phase displays therefore form a small, creative addition to a watch dial.

Proceeding from this, the object of the invention is to provide a moon phase display which, with a compact design, makes possible an attractive large-area representation of the moon phase.

BRIEF SUMMARY OF THE INVENTION

An embodiment of a moon phase display includes a display plane in which the current moon phase is displayed and multiple display elements which are each rotatably supported about their longitudinal axis and include a first strip-shaped side face on which an illuminated moon portion is depicted. The moon phase display further includes a second strip-shaped side face on which no illuminated moon portion is depicted. Each of the display elements has a first rotational position in which the first side face is arranged in the display plane, and a second rotational position in which the second side face is arranged in the display plane. The first side faces together represent the full moon in a full moon position in which all the display elements are located in their first rotational position. A drive is further included which can rotate each of the individual display elements independently of the remaining display elements about its longitudinal axis and a controller. The controller is configured to actuate the drive so that, starting from the full moon position, each one of the display elements is rotated into the second rotational position in successive steps until all the display elements are located in the second rotational position, so that a gradually waning moon is displayed.

In an embodiment, the display elements have an elongated basic form with a longitudinal axis. The display elements can be cylindrical, i.e., have a constant cross section over their length. In this case, the two side faces are at a constant distance from the longitudinal axis. The two side faces are strip-shaped, they each form a longitudinal side of the display element. By way of example, the display elements can have a rectangular cross section, wherein the two side faces lie on the longer sides of the rectangle opposite one another. The first rotational position and the second rotational position then differ by an angle of 180°. If the display elements are triangular in cross section, in particular in the form of an equilateral triangle, the angle between the two rotational positions is 120° or respectively 240°. Both side faces can have the same form and size. In particular, they can be rectangular. In the first rotational position, the first side face is located in the display plane, in the second rotational position the second side face, wherein the second side face is then in particular in the same position in which the first side face is located in the first rotational position.

In an embodiment, the display elements can be arranged next to one another. The longitudinal axes can be arranged parallel in one plane. In the full moon position, the first side faces of adjacent display elements can adjoin one another or almost adjoin one another, so that they form an approximately closed area. However, they can also be arranged at a visible distance from one another, wherein this distance can remain clear or can be filled or almost filled by another element. Such a distance can be utilized as a creative means in order to emphasize the representation of the moon which is composed of multiple portions.

In an embodiment, the drive can rotate each display element individually about its longitudinal axis and, as a result, in particular set the first and second rotational position. The rotation can be executable smoothly or stepwise, for example using a stepping motor or servomotor or a rotary magnet. In particular, each display element can have its own drive, for example with its own stepping motor or servomotor or a rotary magnet. However, a central drive having a suitable coupling mechanism is also conceivable.

In an embodiment, an electronic controller which actuates, e.g., stepping motors or servomotors assigned to the display elements, can be used as the controller. However, a purely mechanical controller is also conceivable. The drive is controlled by the controller so that all of the side faces arranged in the display plane at a specific point in time display the current moon phase. In the full moon position, all the display elements are located in the first rotational position so that all the first side faces are arranged in the display plane. Each of these side faces shows an illuminated moon portion and, together, they represent the full moon. In an embodiment, a battery or an accumulator, for example, can be provided in order to supply the drive and controller with energy. A mains connection is likewise possible.

With each step, one of the display elements is brought from the first rotational position into the second rotational position, so that the relevant first side face and the illuminated moon portion depicted thereon are no longer arranged in the display plane. Consequently, the moon gradually wanes. After the last step, all the display elements are located in the second rotational position so there is no longer any illuminated moon portion visible, which corresponds to a new moon.

It goes without saying that the controller is preferably configured to reset individual display elements in further steps by rotating them further (in the same direction or in the opposite direction) from the second into the first rotational position, so that the moon gradually waxes until the full moon position is reached again.

The steps can be executed at firmly predefined time intervals, which are dimensioned so that the represented image of the moon corresponds in the best possible way to the current moon phase at any point in time. The length of the time intervals depends in particular on the number of steps required/the number of display elements.

In an embodiment, the number of display elements is an even number and lies in the range from 4 to 60. Thanks to the even number, it is possible to achieve an optimal representation of the half-moon if the moon portions depicted on one half of the existing display elements together form a semicircle. As few as four display elements are sufficient for a meaningful representation of the moon phase, since it is possible to distinguish between a new moon, a quarter-moon, a half-moon, a gibbous moon and a full moon therewith. A larger number of display elements is required for a more differentiated representation. It also contributes to compact dimensions of the moon phase display, because the installation space needed to receive the display elements or respectively for the rotational movement thereof can make do with a smaller depth.

In one embodiment, the number of display elements is 14. This number allows a sufficiently differentiated representation of the moon phase. In addition, a complete moon phase cycle, which lasts approximately 29.5 days, is represented in 28 steps, so that the time intervals between successive steps are approximately 24 hours or can be approximated by 24 hours. The representation changes, as a result, once a day at a fixed or roughly fixed time, which can make the moon phase display particularly attractive to a viewer.

When the drive is actuated, the controller can execute the successive steps at fixed intervals so that the displayed moon phase corresponds in the best possible way to the current moon phase. Alternatively, it can take account of the current time, for example so that the steps are always executed every day at the same time, or so that no steps are executed during predefined rest periods (by way of example at night between 10 p.m. and 8 a.m.). In the latter case, a pending step can then either be brought forward to a time before 10 p.m. or caught up on at a time after 8 a.m.

In one embodiment, the longitudinal axes of the display elements run perpendicularly with respect to the field of view of a viewer who is viewing the moon phase display in a usage position. In the case of a moon phase display integrated into a watch, this means that the longitudinal axes are arranged parallel to a line which connects the 12 o'clock and the 6 o'clock position of a conventional 12-hour dial. In the case of a moon phase display integrated into a grandfather or wall clock or another moon phase display either standing or hanging on the wall, the longitudinal axes accordingly run in the vertical direction. As a result of this alignment of the longitudinal axes, a representation of the moon is attained which, as a general rule, corresponds better to the moon observed in the sky than in the case of a horizontal alignment of the longitudinal axes.

In one embodiment, the controller is configured so that the number of successive steps (from full moon to new moon) corresponds to the number of display elements, wherein a display element arranged on a first side of the moon phase display is rotated in the first step, the display element located directly next to it is rotated in the second step, and so on until, in the last step, a display element arranged on a second side of the moon phase display opposite the first side is rotated.

In one embodiment, the controller has a northern hemisphere operating mode and a southern hemisphere operating mode, wherein, in the northern hemisphere operating mode, a display element located on the far right based on the viewer's field of view is rotated in the first step and, in the southern hemisphere operating mode, a display element located on the far left based on the viewer's field of view is rotated in the first step. As a result, the representation attained corresponds to the appearance of the moon which a viewer can see in the sky in the respective hemisphere.

In one embodiment, the first side faces form a square area in the display plane in the full moon position. This shape is ideal for representing a format-filling, circular full moon.

In one embodiment, partial areas of the first side faces, which adjoin the depictions of the illuminated moon portions, have a background color. A dark color can be selected for the background color, corresponding to the night sky. As a result, in the case of a full moon, the moon is represented against a uniform background.

In one embodiment, the second side faces have the background color. As a result, the illuminated moon portions are also represented against a uniform background for each representation of the partial moon.

In one embodiment, an unilluminated moon portion is depicted on each of the second side faces. As a result, as in reality, the portions of the moon which are not directly illuminated by the sun are also visible. This is a special design feature which cannot be realized with the conventional moon phase displays described in the introduction.

In one embodiment, partial areas of the second side faces, which adjoin the depictions of the unilluminated moon portions, have the background color. As a result, the entire moon is represented against a uniform background in each partial moon position.

In one embodiment, the moon phase display has a frame which is arranged in the display plane and frames the display elements. The frame forms an aesthetic finish to the area formed by the display elements. At the same time, it helps to protect the movable display elements from damage and can serve to receive suitable bearings and/or the drive and/or the controller.

The frame is preferably kept in the background color. As a result, a uniform appearance of the moon phase display is achieved. In addition, the recognizability of its structural design can be wholly or partially concealed with movable display elements.

In one embodiment, the display elements each have a third, strip-shaped side face which is arranged in a third rotational position in the display plane. In this case, the display elements can in particular be triangular in cross section. Additional states of the moon phase can be displayed with the aid of the third side faces. By way of example, the second side faces can be kept entirely in the background color and the third side faces can have depictions of unilluminated moon portions. It is then possible to switch over between the two representation variants explained.

In one embodiment, the drive for each of the display elements has its own drive unit with a stepping motor or servomotor or a rotary magnet. As a result, the rotational position of each display element can be set with the same precision. The drive units can be screwed via elongated holes to a bearing structure of the moon phase display so that it is possible to finely adjust the position of the display elements. The elongated holes can be aligned in particular so that the position of the display elements can be adjusted in the direction of the display planes (that is to say perpendicular to the normal direction of the display plane). At the ends opposite the drive unit, the display elements can each be supported in a supporting element, the position of which can be executed in a finely adjustable manner in the same way via an elongated hole connection. This makes it possible to adjust the position of the display elements simply so that there are equal distances between adjacent display elements.

In one embodiment, the drive unit of one of the display elements is arranged at an upper end and the drive unit of an adjacently arranged display element is arranged at a lower end of the respective display element. This can apply to each pair of adjacent display elements. In other words, the drive units are always arranged alternately at opposite ends of the display elements. An installation space is then available to each drive unit, which is approximately twice as large as the free space above or respectively below a display element. As a result, a miniaturization of the moon phase display is possible.

In one embodiment, a safety coupling is arranged between one of the display elements and the drive, which safety coupling releases a positive fit or force fit between the drive and the display element when a predefined torque is exceeded. In particular, such a safety coupling can be assigned to each of the display elements. The safety coupling prevents overloading of the drive and/or other damage in the event of the rotational movement being obstructed or blocked.

In one embodiment, the safety coupling has an elastic coupling element which interacts with a flat spot of a shaft firmly connected to the drive or the display element. In the event of an obstruction or blockage, the elastic coupling element can deform and slide off the flat spot.

In one embodiment, the drive is subject to play and the display element is assigned a spring element and a control part that interacts with the spring element, wherein the control part for each of the side faces of the control part has a flat spot on which the spring element rests in a planar manner when the display element is located exactly in the associated rotational position. The spring element and the control part together form a mechanism which ensures an exact alignment of the display element in the intended resting positions. The fact that the drive is subject to play means that the rest position when the drive is stationary is only fixed within certain limits, e.g., with a possible deviation of +/−0.5° to +/−5°. In connection with the safety coupling mentioned, such a rotational play can be attained, for example, by a gap between the elastic coupling element and the flat point of the shaft of the drive element. The spring element is responsible for the exact alignment, which exerts a spring force on the flat spot, which depends on the relative rotational position of the spring element and the control part. If the spring element rests in a planar manner on the flat spot, the forces act symmetrically to the axis of rotation and no torque is exerted. The control part is arranged concentrically to the axis of rotation of the display element. The flat spots can be arranged distributed over a circumference of the control part. The control part can be connected to the display element in a non-rotational manner, that is to say it can also rotate with the control part. In this case, the control element can be arranged in a fixed manner, e.g., fastened to a frame of the moon phase display. In particular, the flat spots can be arranged parallel to the respectively associated side face, for example on a "rear side" of the display element opposite the associated side face with regard to the axis of rotation. The reverse arrangement is also possible, that is to say a spring element connected in a non-rotational manner to the display element and a control part arranged in a fixed manner, e.g., on a frame.

BRIEF DESCRIPTION OF THE DRAWINGS

The invention is explained in greater detail below with reference to an exemplary embodiment represented in figures, wherein.

DETAILED DESCRIPTION OF THE INVENTION

FIG. 1 shows a moon phase display having fourteen display elements 10-36 and a frame 38 enclosing the display elements 10-36. The display elements 10-36 each have a first and a second strip-shaped, rectangular side face. The display elements 10-36 are rotatably supported about a vertical longitudinal axis.

Figure 1C:
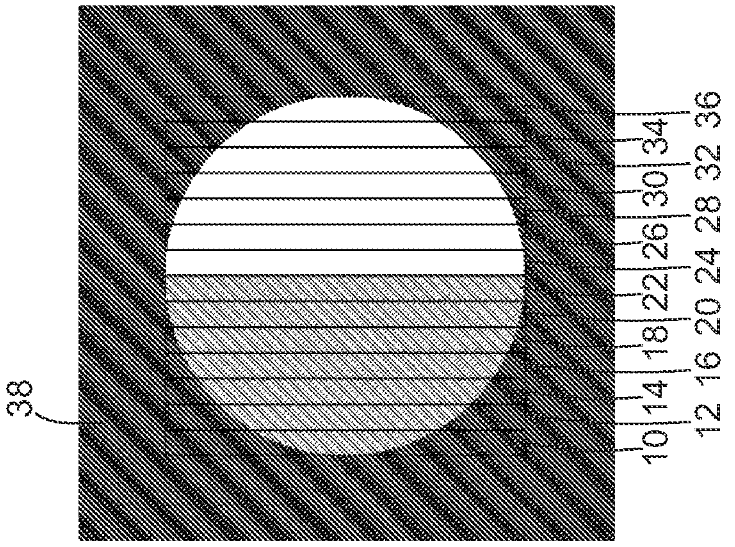
FIG. 1C illustrates an embodiment of the moon phase display of FIGS. 1A and 1B at a third point in time.
Figure 1B:
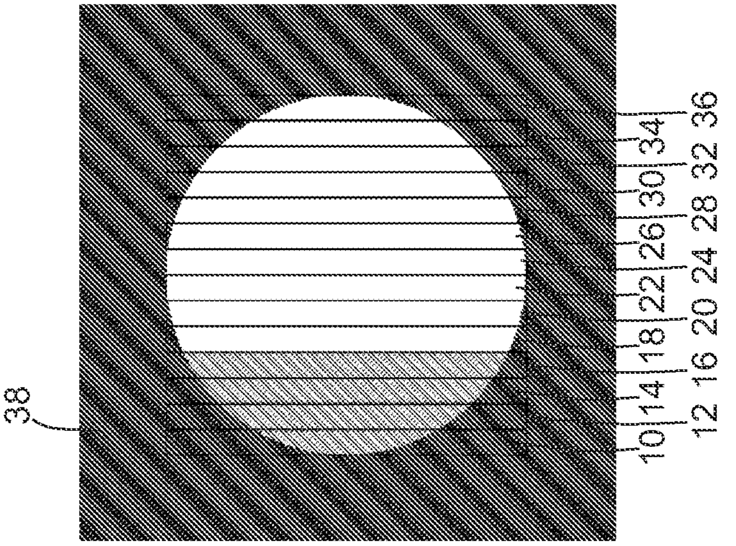
FIG. 1B illustrates an embodiment of the moon phase display of FIG. 1A at a second point in time.
Figure 1A:
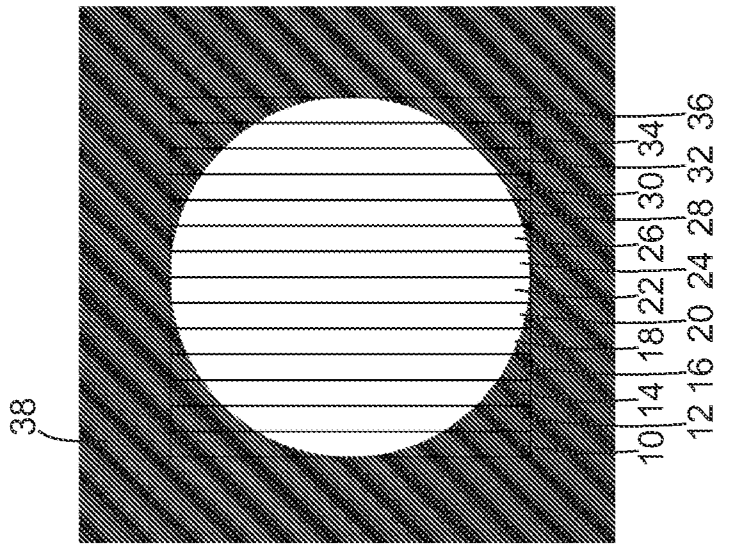
FIG. 1A illustrates an embodiment of a moon phase display at a first point in time.

In the situation represented in FIG. 1A, all the display elements 10-36 are located in a first rotational position in which the first side face is arranged in each case in a display plane corresponding to the drawing plane. Together, the first side faces of the display elements 10-36 almost completely fill a square area of the display plane. The front of the frame 38 is likewise located in the display plane. It has a square form and a square section in which the display elements 10-36 are arranged so that they fill this section almost completely.

An illuminated moon portion, which is represented in white in FIGS. 1A-C, is depicted on each of the fourteen first side faces. Together, the first side faces represent the full moon; the situation shown in FIG. 1A is the full moon position. Partial areas of the first side faces, which each adjoin the illuminated moon portion, are kept black in the color forming a background. The frame 38 is likewise black so that the full moon appears against a background which is consistent overall.

Starting from the full moon position shown in FIG. 1A, the display elements 10-36 are individually brought into their respective second rotational position in successive steps. In the first step this happens for the display element 10 arranged on the far left, then for the adjacent display element 12, and so on. After four steps, this produces the position shown in FIG. 1B, in which the moon has waned by a good quarter (more precisely: by four fourteenths). The four display elements 10, 12, 14 and 16 arranged on the left are now located in their second rotational position, in which a second side face is arranged in each case in the display plane. No illuminated moon portion is depicted on the second side faces, but in each case an unilluminated moon portion which is represented in gray. Partial areas of the second side faces, which adjoin the unilluminated moon portions, are kept black in the background color. The diameter of the moon depiction is adapted to the dimensions of the first side faces so that the area filled by the display elements 10-36 is almost completely or completely exploited.

After three further steps, the display elements 18, 20 and 22 are also located in their second rotational position; this situation shown on in FIG. 1C is a half-moon position. The course shown in FIGS. 1A-C correspond to a southern hemisphere operating mode, since it represents the situation to be observed in the night sky in the southern hemisphere, in which the moon is waning "from the left". In a northern hemisphere operating mode (not shown), starting from the full moon position, the display element 36 located on the far right is initially rotated into the second rotational position.

Figures 2A, 2B, 2C:
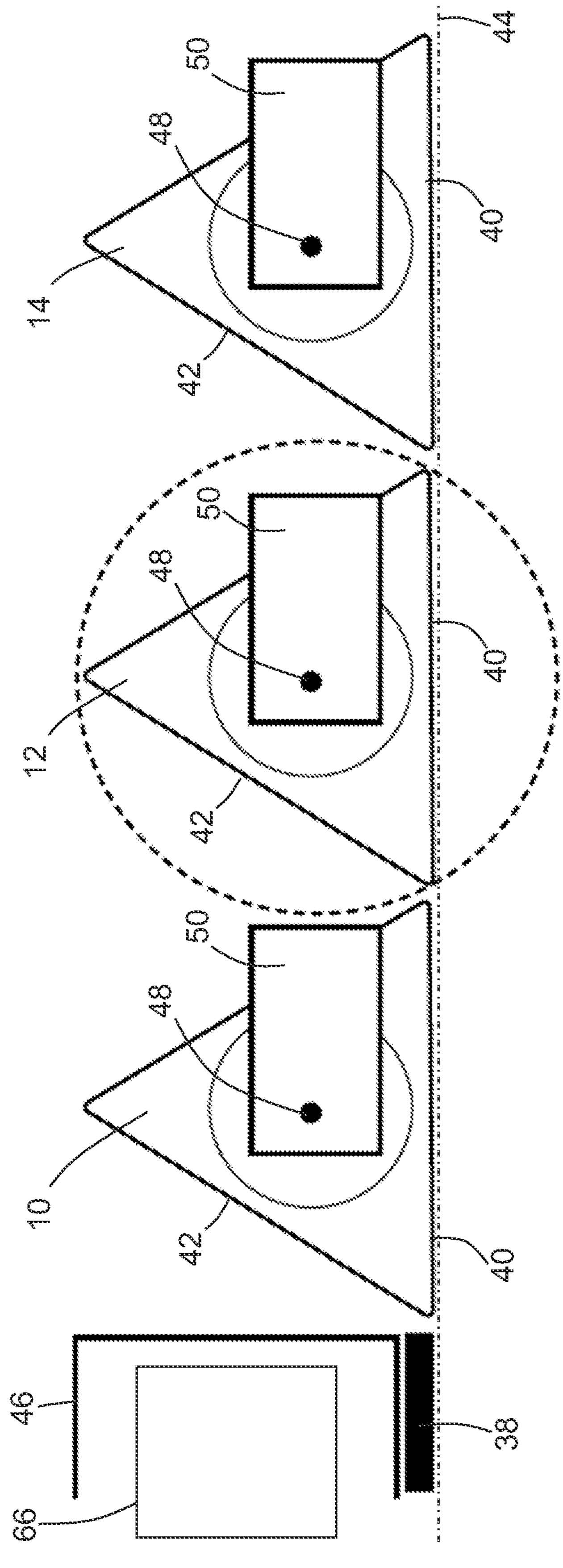
FIG. 2A illustrates a schematic sectional representation of an embodiment of a section of the moon phase display from FIG. 1A.
FIG. 2B illustrates a schematic sectional representation of an embodiment of a section of the moon phase display from FIG. 1B.
FIG. 2C illustrates a schematic sectional representation of an embodiment of a section of the moon phase display from FIG. 1C.

In FIGS. 2A-C, the display elements 10, 12, 14 are shown schematically in cross section. They each form an equilateral triangle. The first side face 40 is arranged on one side of the triangle, and the second side face 42 is arranged on a second side of the triangle. In the position shown, the first side faces 40 are located in the display plane illustrated by a dotdashed line 44. Adjoining the first side face 40 of the display element 10 (FIG. 2A), a piece of the frame 38 can be seen, the front side of which likewise lies in the display plane. A vertically arranged carrier 46 which forms part of a bearing structure is located behind the frame 38. A supporting element 50, which is only schematically indicated, for each display element 10-36 is located on a further element of the bearing structure, a horizontal carrier not represented in FIGS. 2A-C. The longitudinal axes 48 about which each of the display elements 10-36 is rotatably supported in the supporting element 50 are likewise represented.

A controller 66, which is configured to control the rotational position of each display element 10-36 is likewise only indicated schematically. For this purpose, the controller 66 is connected to drive units 60 (see FIG. 4). The electronic controller 66 and the drive units 60 are supplied with electrical energy by an accumulator which is not represented.

Figure 3:
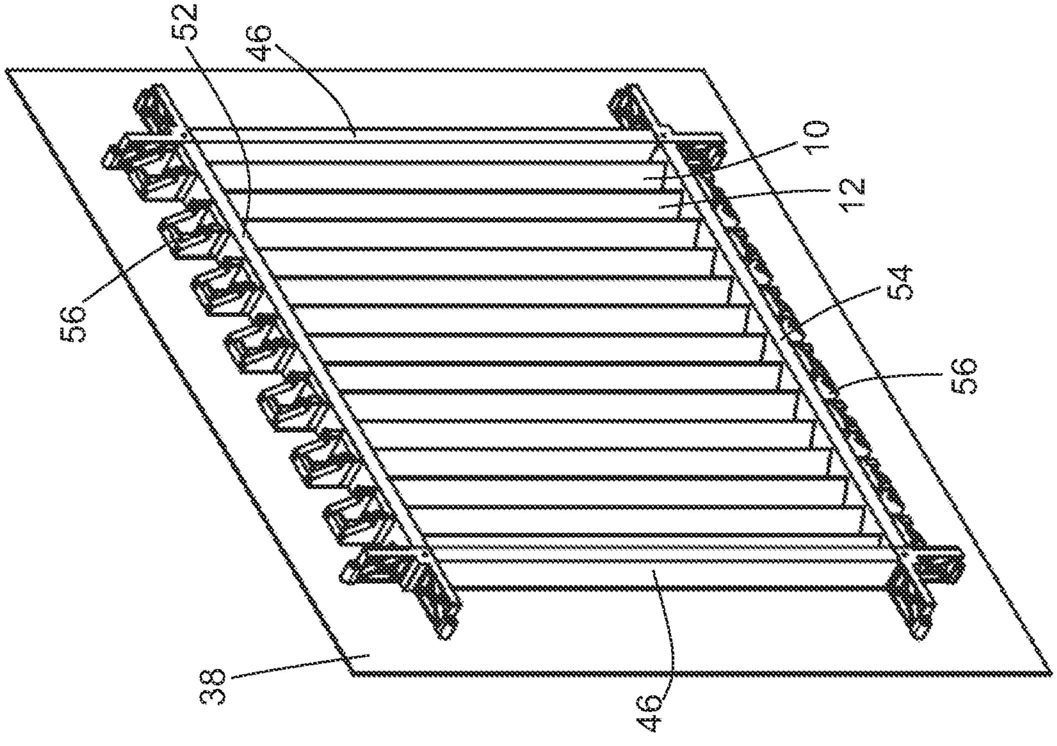
FIG. 3 illustrates a rear perspective view of the embodiment of the moon phase display from FIGS. 1A-C.

FIG. 3 shows a rear view of the moon phase display, wherein a rear wall (not represented) has been removed. The back of the frame 38 as well as two of the vertical carriers 46 and two horizontal carriers 52, 54 which form a bearing structure for the display elements 10-36 can be seen. The frame 38 is fastened to this bearing structure.

The display elements 10-36 (only partially provided with reference numbers in FIG. 3) each adjoin one of the horizontal carriers 52, 54 with their upper and lower ends. Holding devices 56 for receiving a drive unit are arranged on every second one of the display elements 10-36 at the upper end of the respective display element 10-36, above the horizontal carrier 52. On the remaining display elements 10-36, such holding devices 56 are located at the lower ends of the display elements 10-36, below the other horizontal carrier 54. The drive units themselves are not shown in detail in FIG. 3.

Figure 4:
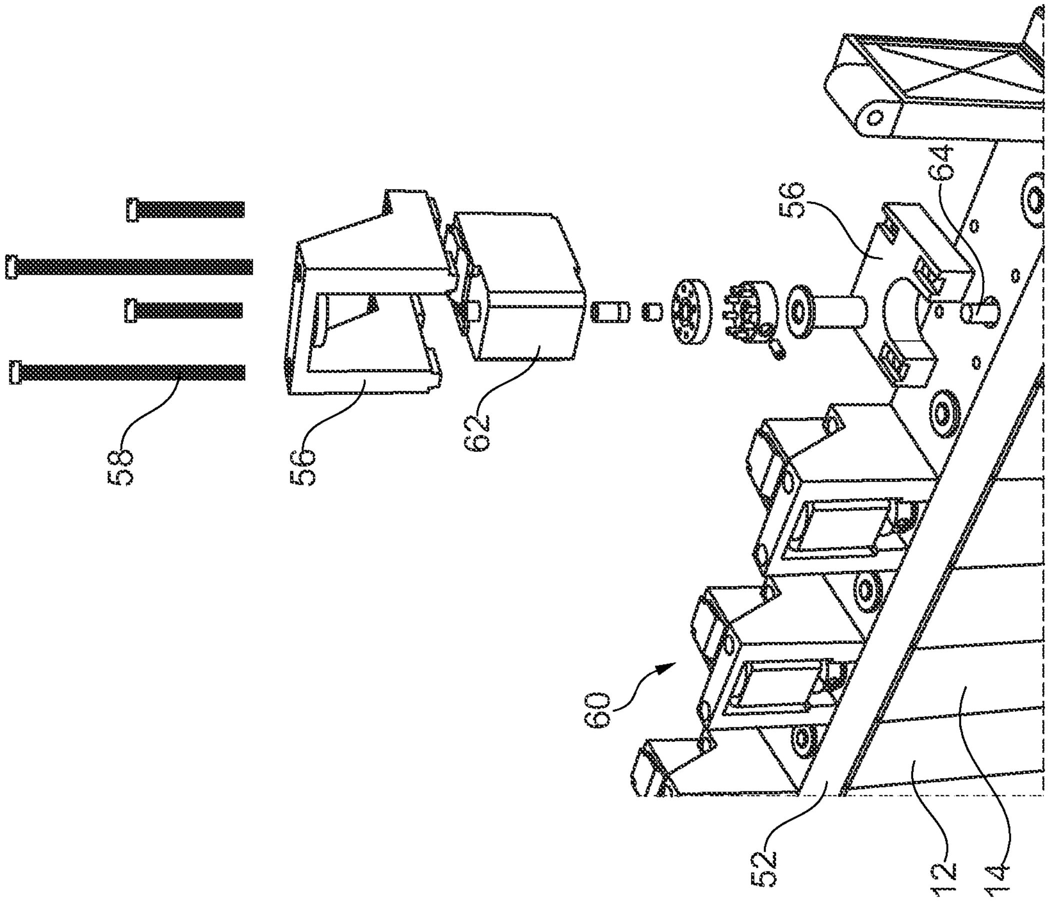
FIG. 4 illustrates an exploded view of an embodiment of a drive of the moon phase display from FIGS. 1A-C.

FIG. 4 shows a section of the moon phase display in a perspective view from the front. Some of the display elements 10-36 and the horizontal carrier 52 arranged above them can be seen. A drive unit 60 having a holding device 56 is arranged above the carrier 52 for every second display element 10-36.

One of these drive units 60 is shown in an exploded representation. It comprises the two-part holding device 56 having four elongated holes through each of which a screw 58 is guided and screwed into the carrier 52, and a servomotor 62 which is connected to a shaft 64 supporting and driving the associated display element 10-36.

Figure 5:
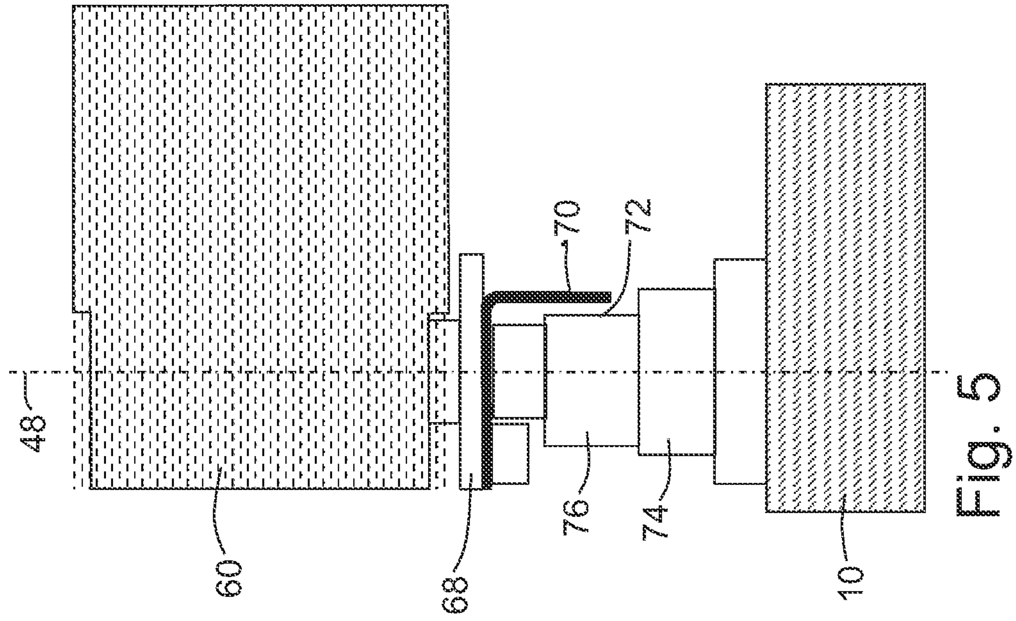
FIG. 5 illustrates a schematic representation of an embodiment of a drive of a display element having a safety coupling.

FIG. 5 shows a portion of a display element 10 at the bottom, which is rotatably supported about the axis of rotation 48 by means of a slide bearing face 74 and is driven by a drive unit 60. The drive unit 60 has a rotary plate 68 to which an elastic coupling element 70 is fastened, which has a laterally deflectable end portion running parallel to the axis of rotation 48. In the rest position shown, this end portion is located at a small distance from the flat spot 72 which is configured on an otherwise circular axis portion 76 arranged concentrically to the axis of rotation 48. When the rotary plate 68 rotates, the end portion comes into contact with the flat spot 72 and takes the display element 10 along with it during the further rotational movement.

If the rotation of the display element 10 is obstructed, the end portion is deflected outwards and slides off the flat spot 72 so that it rests on the remaining lateral surface of the axis portion 76. Consequently, the flat spot 72 and the elastic coupling element 70 form a safety coupling. After remedying the obstruction, the display element 10 can be realigned so that the flat spot 72 is located on the end portion. This can easily be done by hand, in particular if the friction between the axis portion 76 and the elastic coupling element is less than the self-obstruction of the drive unit 60.

Figure 6:
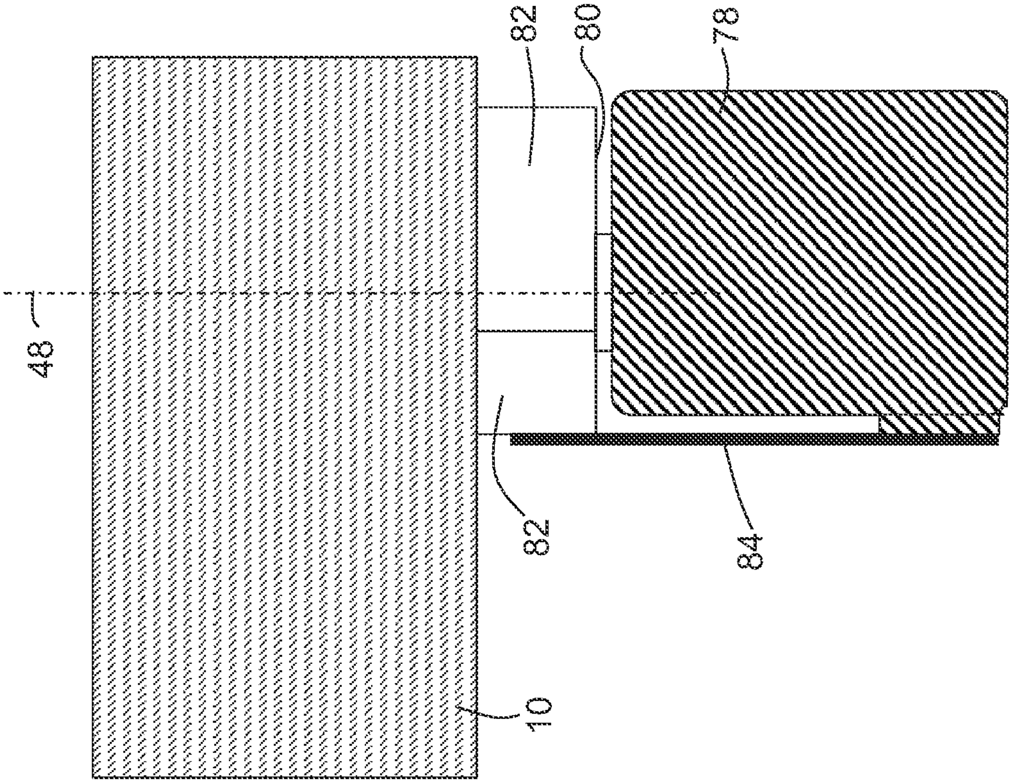
FIG. 6 illustrates a schematic representation of the embodiment of the display element from FIG. 5, which is equipped with a spring element and a control part for fixing a rest position.

In FIG. 6, a lower portion of the display element 10 from FIG. 5 is shown. It is rotatably supported about the axis of rotation 48 in a frame part 78. A control part 80 is arranged below the display element 10 concentrically to the axis of rotation 48 and is connected in a non-rotational manner to the display element 10. It has three flat spots 82 which are each assigned to a side face of the display element 10. The free end of a spring element 84, which is fastened to the frame component 78, rests in a planar manner on one of these flat spots 82. When the display element 10 is rotated, the free end of the spring element 84 is deflected outwards away from the axis of rotation 48. As a result, it exerts a torque on the control part 80 that is sufficient to bring the display element 10 exactly into the desired rotational position within the rotational play.

LIST OF REFERENCE NUMERALS

10-36 Display element
38 Frame
40 First side face
42 Second side face
44 Line (display plane)
46 Carrier (vertical)
48 Axis of rotation
50 Supporting element
52, 54 Carrier (horizontal)
56 Holding device
58 Screw
60 Drive unit
62 Servomotor
64 Shaft
66 Controller
68 Rotary plate
70 Elastic coupling element
72 Flat spot
74 Slide bearing face
76 Axis portion
78 Frame part
80 Control part
82 Flat spot
84 Spring element

The invention claimed is:

1. A moon phase display comprising:

a frame;

a plurality of display elements which are each supported by the frame and configured to rotate about a longitudinal axis relative to the frame, the plurality of display elements further comprises, a first strip-shaped side face on which an illuminated moon portion is depicted, a second strip-shaped side face on which no illuminated moon portion is depicted, a first rotational position in which the first strip-shaped side face is arranged along a display plane wherein the first strip-shaped side faces together represent a full moon in a full moon position in which all of the plurality of display elements are located in their first rotational position, and a second rotational position in which the second strip-shaped side face is arranged along the display plane;

a drive configured to rotate each of the plurality of display elements independently of each other about the longitudinal axis; and a controller configured to actuate the drive so that, starting from the full moon position, each one of the plurality of display elements is rotated into the second rotational position in a number of successive steps until all of the plurality of display elements are located in the second rotational position, so that a gradually waning moon is displayed.

2. The moon phase display according to claim 1, wherein the plurality of display elements comprises an even number from 4 to 30.

3. The moon phase display according to claim 1, comprising fourteen (14) display elements.

4. The moon phase display according to claim 1, wherein the longitudinal axis of each of the plurality of display elements runs perpendicular relative to a field of view of a viewer who is viewing the moon phase display in a usage position.

5. The moon phase display according to claim 1, wherein the number of successive steps corresponds to the number of display elements, wherein one of the plurality of display elements arranged on the first strip-shaped side face is rotated in a first step, wherein a second of the plurality of display elements is located directly next to the first of the plurality of display elements and is rotated in a second step, and wherein each successive display element is rotated in successive steps, in a last step, a last of the plurality of display elements is arranged on a second side of the moon phase display opposite the first side is rotated.

6. The moon phase display according to claim 5, wherein the controller comprises a northern hemisphere operating mode and a southern hemisphere operating mode, wherein, in the northern hemisphere operating mode, a display element located on a far right based on the viewer's field of view is rotated in the first step and, wherein in the southern hemisphere operating mode, a display element located on a far left based on the field of view of the viewer is rotated in the first step.

7. The moon phase display according to claim 1, wherein the first strip-shaped side faces form a square area in the display plane in the full moon position.

8. The moon phase display according to claim 1, wherein partial areas of the first strip-shaped side faces, which adjoin depictions of the illuminated moon portions, comprise a background color.

9. The moon phase display according to claim 8, wherein the second strip-shaped side faces comprise the background color.

10. The moon phase display according to claim 1, wherein an unilluminated moon portion is depicted on each of the second strip-shaped side faces.

11. The moon phase display according to claim 10, wherein partial areas of the second strip-shaped side faces, which adjoin the depictions of the unilluminated moon portions, comprise a background color.

12. The moon phase display according to claim 1, wherein the frame is positioned in the display plane and is configured to frame the plurality of display elements, and wherein the frame comprises a background color.

13. The moon phase display according to claim 1, wherein the plurality of display elements each comprise a third, strip-shaped side face which is arranged in a third rotational position along the display plane.

14. The moon phase display according to claim 1, wherein the drive for each of the plurality of display elements comprises a separate drive unit including one of (i) a stepping motor, (ii) a servomotor, and (iii) a rotary magnet.

15. The moon phase display according to claim 14, wherein the drive unit of one of the plurality of display elements is arranged at an upper end and the drive unit of an adjacent display element is arranged at a lower end of the adjacent display element.

16. The moon phase display according to claim 1, further comprising a safety coupling arranged between one of the plurality of display elements and the drive, wherein the safety coupling releases one of a positive fit and a force fit between the drive and one of the display elements when a predefined torque is exceeded.

17. The moon phase display according to claim 16, wherein the safety coupling comprises an elastic coupling element configured to interact with a flat spot of a shaft firmly connected to one of (i) the drive and 9ii) the display element.

18. The moon phase display according to claim 1, wherein the drive is subject to play and the display element is assigned a spring element and a control part configured to interact with the spring element, wherein the control part for each of the first and second strip-shaped side faces of the plurality of display elements comprises a flat spot on which the spring element rests in a planar manner when a corresponding display element is located in an associated rotational position.

* * * * *